Jan. 9, 1945. G. A. OVERSTROM 2,366,980
HEAD MOTION FOR RECIPROCATING CONVEYING MOTIONS
Filed April 17, 1942 4 Sheets-Sheet 1
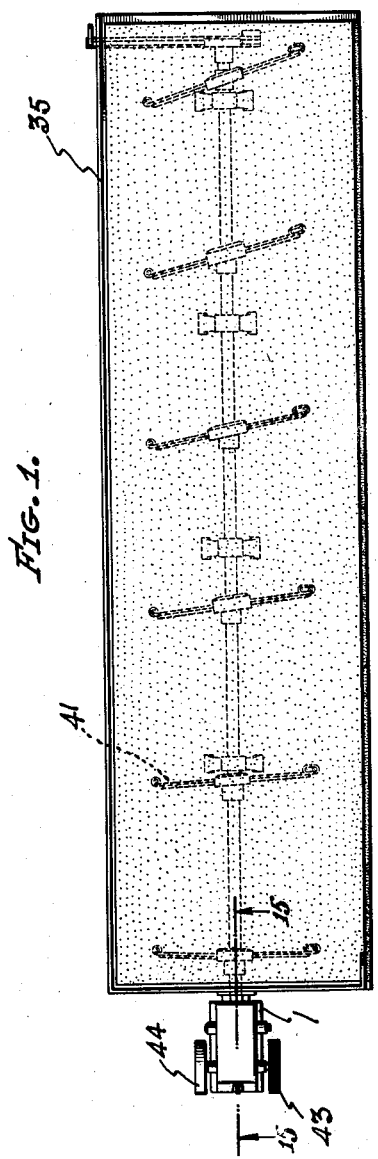
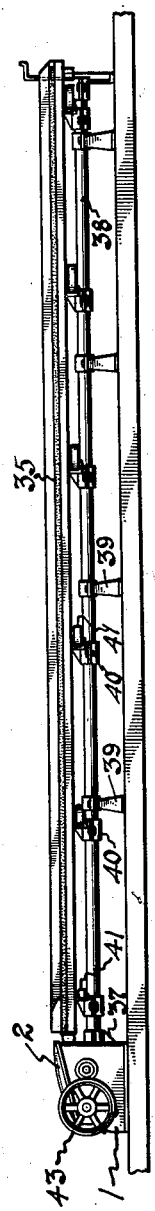
INVENTOR.
GUSTAVE A. OVERSTROM,
BY
ATTORNEYS.

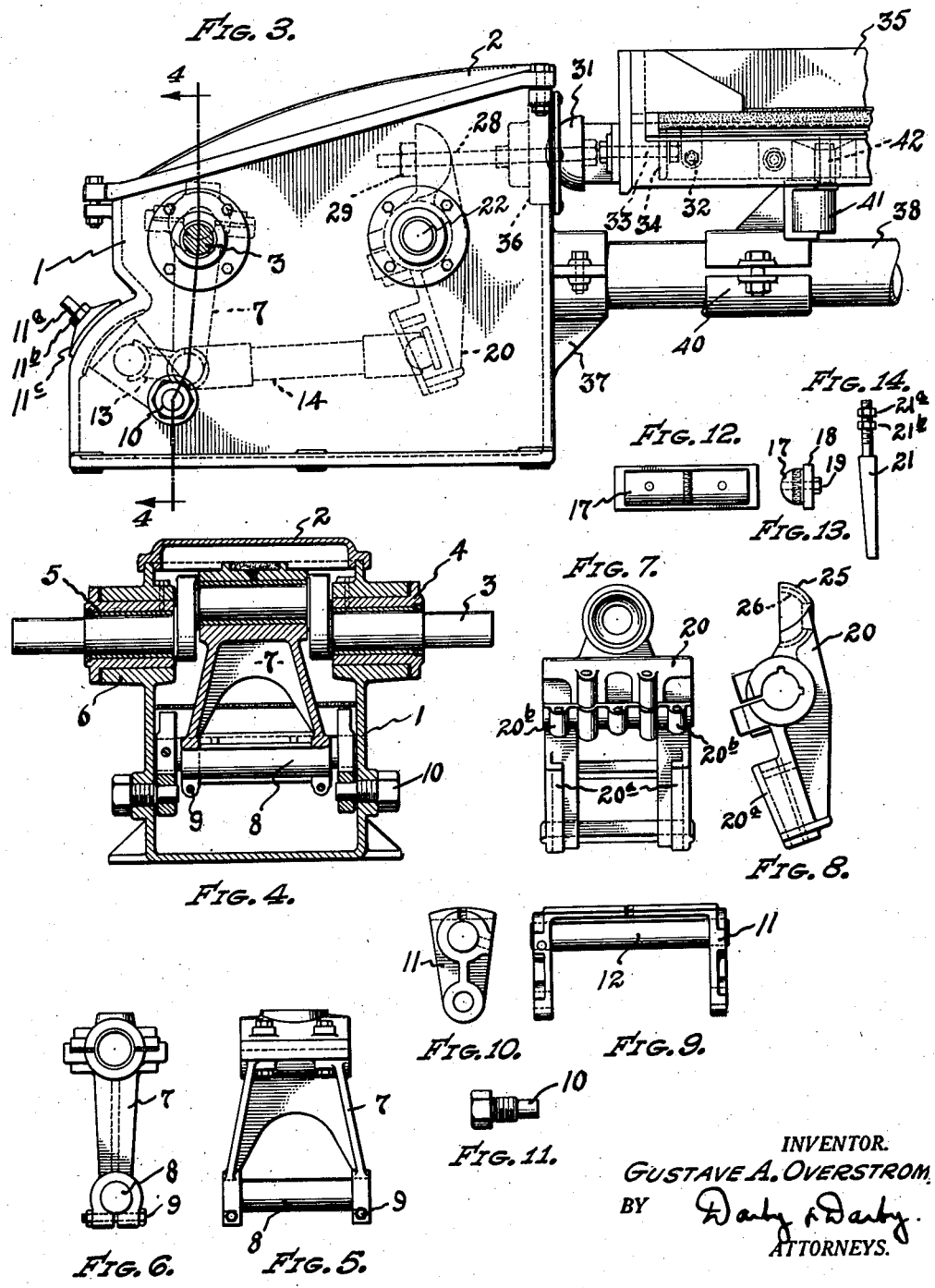

Jan. 9, 1945.　　　　G. A. OVERSTROM　　　　2,366,980
HEAD MOTION FOR RECIPROCATING CONVEYING MOTIONS
Filed April 17, 1942　　　4 Sheets-Sheet 3

INVENTOR.
GUSTAVE A. OVERSTROM,
BY Darby & Darby
ATTORNEYS.

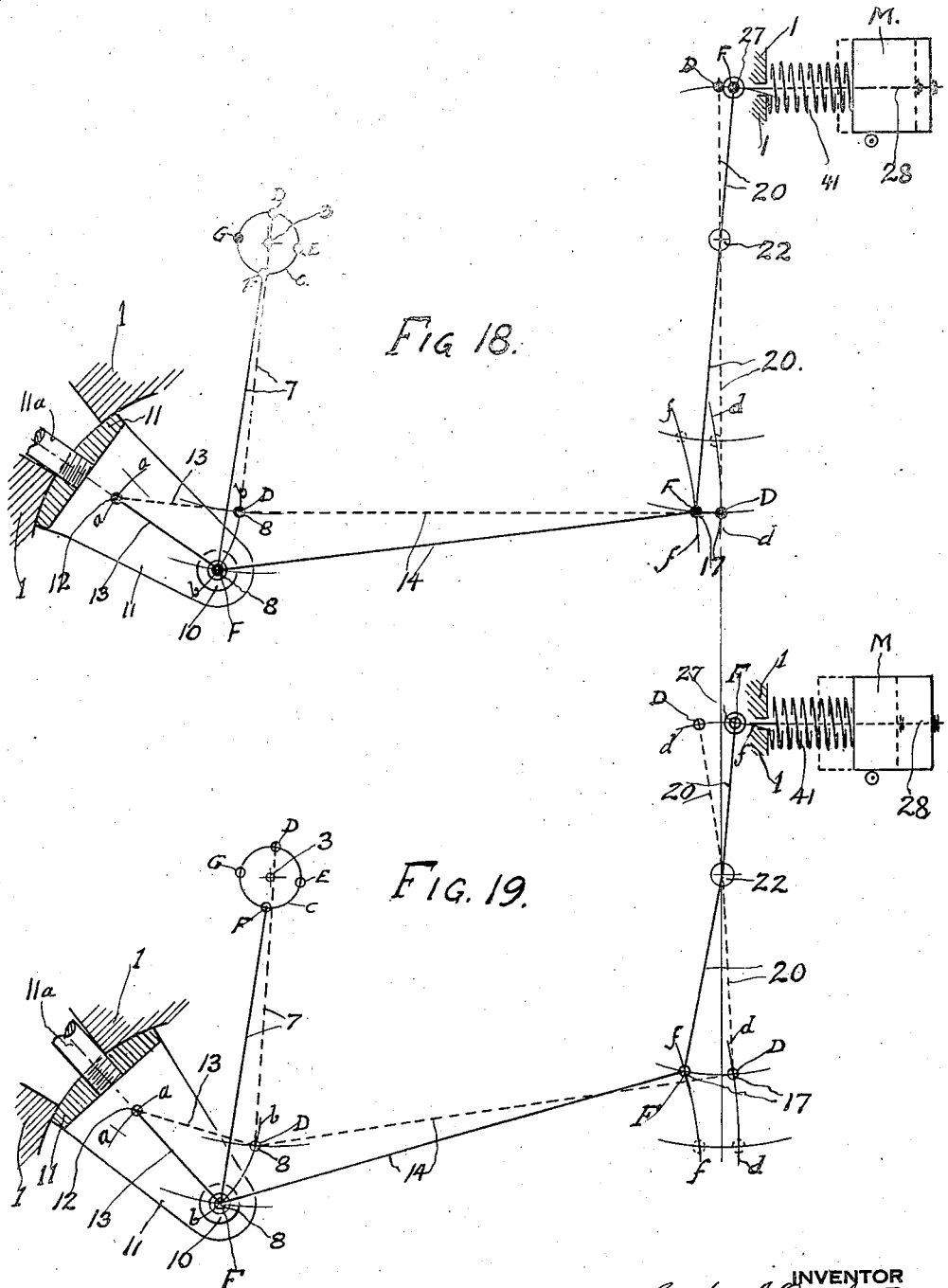

Patented Jan. 9, 1945

2,366,980

UNITED STATES PATENT OFFICE 2,366,980

HEAD MOTION FOR RECIPROCATING CONVEYING MOTIONS

Gustave A. Overstrom, Los Angeles, Calif.

Application April 17, 1942, Serial No. 439,312

14 Claims. (Cl. 74—26)

This invention relates to improvements in reciprocating conveying head motions, particularly of a type adapted for use in concentrating tables, screens, and reciprocating conveyors.

This invention is particularly concerned with improvements in the manner of adjusting the stroke of reciprocating conveying head motions; and further concerns the manner in which an initial spring tension is maintained on the open joints of a head motion mechanism regardless of the adjustments for increasing and decreasing the stroke of the head motion.

It has been found from practical experience in the operation of concentrating tables, for example, that loose play in the open joints of a head motion occurs when spring tension is lessened due to stroke adjustment; and it has been found that if one adjusts the spring tension to maintain enough pressure throughout the system to keep the open joints of a head motion mechanism tight under all conditions of stroke adjustment, the bearings of the machine will run hot.

Heretofore, if one has spring tension or pressure enough for a predetermined stroke, a change of stroke will disturb this spring pressure balance and cause knocking in the open joints of a head motion. Should one create more than enough pressure or tension throughout the system to keep the joints tight with the idea in mind of maintaining sufficient pressure to prevent knocking in the joints when stroke adjustment is made, then such added pressure causes the head motion to run hot. Thus it will be seen that in reciprocating conveying head motions of the prior art there is required an adjustment of spring tension for an adjustment of stroke. This invention, by the manner of the arrangement of its mechanism, obviates these difficulties heretofore encountered in this art.

I have discovered that by maintaining a constant initial spring pressure in a reciprocating conveying motion mechanism, which fixed pressure will not be disturbed by stroke adjustment, all knock from lost motion is prevented under all conditions of adjustment, heating in the joints is prevented and much larger machines can be built and maintained free of repairs, than has heretofore been possible.

The main object of this invention is to so position the parts of the mechanism that from a predetermined point of motion and pressure of the springs which take up lost motion in the joints, a lengthening of the stroke will automatically increase, and a shortening of the stroke will automatically decrease, the spring pressure.

Another object of the invention is the provision of means outside the casing to effect stroke adjustment without leakage of oil from said casing.

Another object of the invention is to provide oil sealing means carried by one of the members that enter into the stroke adjustment.

This invention resides substantially in the construction, arrangement and relative location of parts, all as will be described in full detail below.

In the accompanying drawings, the same reference numerals have been used throughout, to indicate the same or similar parts.

Figure 1 is a plan view of the invention applied to the deck of a concentrating table. Details of the deck of the concentrating table not connected with the invention, such as wash water boxes and feed boxes, have been omitted for the sake of simplicity.

Figure 2 is a side elevation of Figure 1.

Figure 3 is an enlarged detail, with parts broken away, of the head motion mechanism of this invention with the flywheels omitted.

Figure 4 is a transverse sectional elevation taken on the line 4—4 of Figure 3 and looking in the direction of the arrows.

Figure 5 is a front elevation of the pitman.

Figure 6 is a side elevation of the same.

Figure 7 is a front elevation of the rocker arm.

Figure 8 is a side elevation of the same.

Figure 9 is a front elevation of the radial arm with the pin shown in place.

Figure 10 is a side elevation of the same.

Figure 11 is an elevation of the journal member on which the radial arm swings.

Figure 12 is a front elevation of the pin upon which the long rocker arm works.

Figure 13 is an end elevation of the same.

Figure 14 is a side elevation of the tapered wedge which holds the pin of Figure 12 tightly in place in rocker arm of Figure 7.

Figure 18 is a diagrammatic arrangement showing both the short and the long toggle adjusted for the shortest possible stroke.

Figure 19 is a diagrammatic arrangement showing both the short and the long toggle adjusted for the longest possible stroke.

Description of the mechanism

Figure 16:
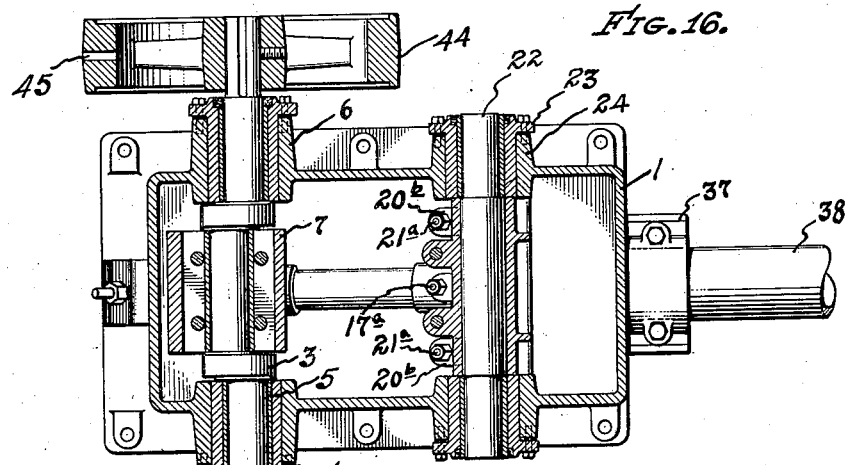
Figure 16 is a horizontal cross section taken along the line 16—16 of Figure 15, looking in the direction of the arrows.

The head motion mechanism itself consists of casing 1 and a lid 2 to close the top of said casing to exclude dirt, etc., and to prevent oil splashing out of the casing. Within the casing 1 is journaled crank shaft 3. The sleeve members 4, carrying bushings 5, snugly fit in the recesses provided for it in the bosses 6, thus holding the shaft in place and providing bearings therefor. A pitman 7 is fastened to the throw of the crank shaft; the lower end of the pitman 7 carries a pin 8 which is firmly held in place by bolts 9, causing the split arms of the pitman to clamp the pin 8 in place.

Pivotally mounted within the casing 1 by pivot pins 10 is a radial arm 11 which carries pin 12. Pin 12 carried by radial arm 11 is adjustable along the arc a—a of Figure 15. Into the upper surface of radial arm 11 there is screwed a pin 11ª; this pin passes through a rectangular slot in casing 1. The slot is wide enough to allow the pin to move in arcuate adjustment and the length of the slot limits the upward or downward adjustment of the pin 11ª. The upper portion of pin 11ª is threaded, and nut 11ᵇ when screwed tightly down engages the upper surface of an arcuate cap 11ᶜ. Thus radial arm 11 is held in any predetermined adjustment when the nut 11ᵇ is tightened against its cap. It should also be noted that by means of this arrangement an effective seal is made so that there can be no escape of oil through the slot in the casing 1. After the desired adjustment of radial arm 11 carrying the pin 12 is made, the pin 12 remains stationary and the pin 8 moves up and down along the arc b—b of Figure 15.

It should be particularly noted that the member 11 carrying pin 12 is movable in the arc of a circle, the arc surface of member 11 at all times being in contact with the arcuate bearing surface of the casing. By this construction one is enabled to manually adjust the member 11 from outside of the casing, which adjustment will effect a change in the stroke of the mechanism. The short, open-ended toggle 13 works in contact with the pin 12 and the pin 8 of the pitman.

The long open-end toggle 14 has one end 15 bearing against pin 8 and the other open end 16 bearing against pin 17. Pin 17 is fastened to a plate 18 by bolts 19. This pin is carried in arcuate movement by rocker arm 20 and is firmly held in place in this rocker arm by a pair of adjustable wedges 21. Plate 18 fits in the guides 20ª and is locked therein by the wedges 21, see Figure 15.

Rocker arm 20 is securely keyed to rock shaft 22. Rock shaft 22 is journaled within the casing 1. Sleeves 23, similar to sleeves 4, fit snugly within the recesses provided in bosses 24. Sleeves 23 each carry a bushing and when sleeves 23 are firmly in place in the recesses of bosses 24 the bushings fit the rock shaft, thus holding it securely in place.

The rocker arm 20 has formed at its upper end a spherical cup-shaped member 25 carrying a Babbitt bearing 26. A spherical ball-and-socket mating member 27 fits within this cavity and bears against the bearing member 26. A pulling rod 28 threadedly engages the member 27. The member 28 is threaded at both its ends and a lock nut 29 is screwed on one end of member 28 and holds member 27 in place. The other end of member 28 carries a similar spherical ball member 30, which engages a mating bearing member in a bracket 31, and a locking nut 29. This bracket 31 is firmly attached to the deck 35 of a concentrating table by means of bolts 32 and 33 firmly clamping member 31 and bracket 34 to the table deck 35.

The casing 1 has an aperture of considerable dimensions through which the member 28 passes, and in order that no oil leaks out of the casing to splash when the machine is running, this aperture is closed by means of a diaphragm 36, one surface of which attaches to the pulling bar 28 and the other surface attaches to the casing 1. The casing 1 has a bracket 37 into which is journaled supporting pipe 38. Pipe 38 is also supported at intervals by brackets 39. Pipe 38 carries spring brackets 40 and into recesses of these brackets are held bow springs 41. The table deck 35 is carried on these bow springs by means of pins 42 fitted in a special bracket in the table deck to attach each spring at its ends to the deck. These bow springs are angularly arranged along the length of the pipe, see Figure 1. Thus the table deck is carried directly on these bow springs which in turn are carried by the pipe. The pipe itself is turnable within the brackets 37 and 39; thus it will be seen that when the table is transversely tilted the pipe rotates within the supporting brackets.

By drawing up the members 27 and 30 the structure is placed in tension and all lost motion within the mechanism is taken up. The ball and socket features allow the table to swing in an arcuate motion in its forward movement and also permit the table to be transversely tiltable.

To one end of the crank shaft there is keyed a pulley 43 suitable for the transmission of the power necessary to run the mechanism. To the other end of the shaft there is keyed a flywheel 44. The flywheel 44 has some slots 45 cored through its rim into which a suitable turning bar may be inserted for rotating the crank shaft to bring it past dead center so as to effect easy starting of the mechanism.

Discussion of the advantages of this mechanism

One of the definite advantages of the mechanism shown in this application lies in the fact that adjustments can be made to the length of the stroke without in any way decreasing the initial spring tension throughout the system.

Figure 17:
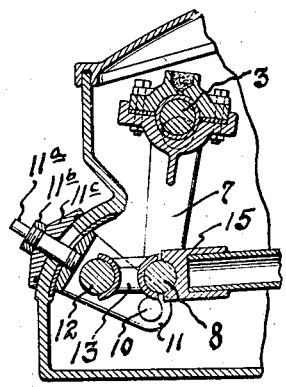
Figure 17 is a partial section of the casing, parts broken away, showing the radial arm at the lowest adjusting position and the pitman at the highest part of its stroke.
Figure 15:
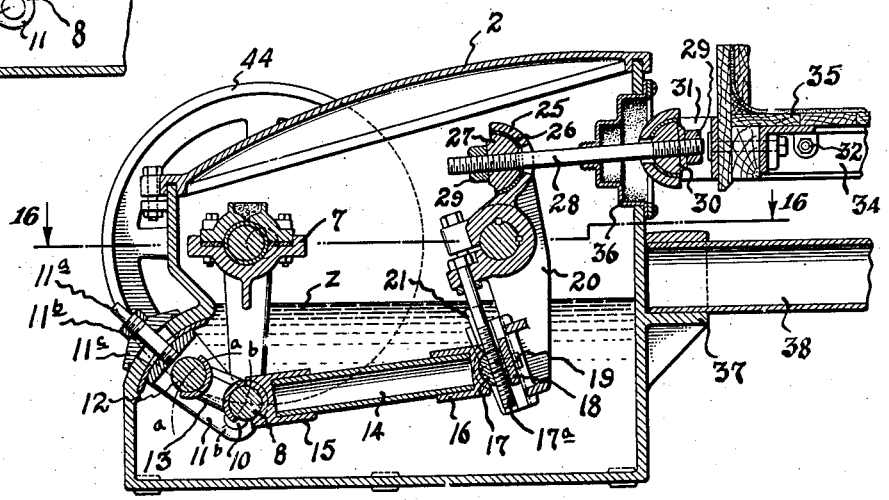
Figure 15 is a vertical section, parts broken away, taken along the line 15—15 of Figure 1, looking in the direction of the arrows, with both the short and the long toggle adjusted for the medium length of stroke.

By means of the positionable arm 11 in the casing 1, the pin member 12 carried by this arm can be adjusted along the arc a—a of Figure 15. For example, Figures 17 and 18 show pin member 12 at the lowest position it can reach in traveling along arc a—a and the short toggle will be adjusted for its shortest stroke. The stroke of the mechanism will be increased as the member 11 is moved upward and will be at its maximum, as far as the adjustment of this arm is concerned, when it reaches a position as high as it can go.

There is another adjustment that can be made in the mechanism to affect the length of the stroke, and that is by means of moving the member 18, carrying member 17, up or down on the bearing surface provided by the guides 20ª on the rocker arm 20. For example, all that is necessary to move the member 17 upward or downward is to rotate the threaded member 17ª, after first loosening on the wedge blocks 21. Each of the wedge blocks 21 has at its upper end a threaded member which engages a nut 21ᵃ above the ear 20ᵇ (see Fig. 7) and a nut 21ᵇ below the ear 20ᵇ on the member 20; and by loosening one nut and tightening on the other this wedge member may be driven either up or down as the case may be. When these wedge members are loose, then by turning member 17ᵃ, movement of member 17 which is threadedly engaged thereby, is effected. If member 17 is moved upward the stroke will be increased. If member 17 is moved downward the stroke will be lessened.

When member 17 is moved upward the stroke will be increased, primarily due to the shortening of the lever arm on which member 17 operates. As the member 17 is moved downward the stroke will be decreased, primarily due to the lengthening of the lever arm on which member 17 operates.

It will be understood that a predetermined movement is imparted to the rocker arm by the toggle mechanism at the common toggle joint for the long and short toggle, and that the farther the member 17 is below the fulcrum point of rocker arm 20 the shorter will be the stroke at the fixed length of the other end of the arm 20; and the closer that member 17 is to the fulcrum point for the same predetermined movement, the longer will be the stroke.

It is readily understood that both the short and the long toggles can be adjusted for any intermediate positions so that any desired nature or length of stroke can be obtained.

Besides these primary reasons given for lengthening and shortening of the stroke there is a contributing cause due to change in angularity of motion acting on the adjusting arc, which will be further explained in the discussion of the diagrammatic Figures 18 and 19.

It should be noted that movement of the radial arm 11 to any predetermined position for stroke adjustment is a very simple procedure, and can be accomplished with hardly any more trouble than one would have in shifting the gears of an automobile.

In the diagrams, Figure 18 and Figure 19, I have shown clearly the principles underlying this invention. The numerals on the lines correspond to the numerals given the parts on the detail drawings. The capital letters represent corresponding time points in the motion, and the small letters represent arcs of movement and/or paths of adjustment.

In both figures the full lines indicating the numbered parts represent the time when the crank in its position is pointing to the common toggle joint or position F on the crank; and the dotted lines indicating the numbered parts when the crank is pointing away from the toggle joint, or position D on the crank.

In Figure 18 I have shown the points in the movement in full black circles, and adjustments of both the short and the long toggle to give the shortest stroke. In Figure 19 the same parts are adjusted to give the longest possible stroke, and the points are represented by open circles. Those points F which are surrounded by an extra circle represent the points in the movement that are purposely made unalterable, or its limits of movement a fixed point.

From these fixed points F, which in the special concentrating table illustrated, are at the end of the forward stroke, all stroke adjustments are arranged to increase backward against increased spring resistance. My reason for this arrangement is as follows. A long stroke gives more momentum to a reciprocating mass than a short stroke, hence on that part of the stroke in which the momentum has a tendency to separate the joints, the spring resistance should be greater on the long stroke than on the short; but it also follows that on that part of the stroke where the momentum has a tendency to close up the joints, no more spring pressure is required for the long stroke than for the short.

In Figures 18 and 19, 1 is part of housing representing solid opposition to motion as well as to spring resistance. 3 represents the crank shaft, and circle c represents the path of the crank. D represents, to begin with, the point in the crank revolution that points away from the common toggle pin 8, and other points in the motion marked with the same letter represent where the various parts are at the same instant of time. F is the point when the crank is pointing towards the common toggle joint; and other points marked D and F represent where the respective joint parts are at the same instant. E and G represent positions of crank at 90° from D and F; 7 is the pitman; 8 is the common toggle pin carried in the end of the pitman; 10 is the pivot in the housing from which the adjusting quadrant 11 can be swung in arc a—a. In part 11 is positioned the stationary pin 12 on which the short toggle 13 works. 14 is the long toggle bearing at one end on pin 8, and at the other end on pin 17 which is adjustable along the arc f—f or d—d on the rocking arm 20. It will be understood that the two arcs represent the same paths, but at opposite ends of the stroke. This arc is of such long radius, as compared to the adjustment distance, that a straight line paralleling the extreme adjustment points can serve approximately the same purpose.

The rocker arm is pivoted at 22 and the opposite end of this arm carries at its end the joint 27 from which the bar 28 connects to the reciprocating mass M. Between the solid opposition 1 and M is placed a spring 41. The extended end of spring 41 reaches substantially the same position for either short or long stroke, but the compressed length becomes substantially as much shorter for the long stroke, as the difference is in length of stroke, and consequently the resistance of the spring becomes as much greater as the additional compression is.

From these diagrams it can be readily understood that all adjustments of the short toggle must be substantially along an arc originating from a pivot 10 located close to the center of the common toggle pin 8 in the pitman 7 when the crank reaches the nearest position to this pivot 10, which in this particular detail construction is almost the lowest position of the crank. Hence, it may be noticed that in this position the point F coincides with the center of members 8 and 10. It should be noted that one can tilt the adjusting quadrant 11 from one position to the other, as far as stud 11ᵃ allows, without changing the position of points F anywhere in either diagram, which is the object desired.

The long toggle adjustment must pivot from the common toggle pin 8, and be along an arc f—f or d—d struck from the center of said pin. The point F on the long end of rocking arm 20, or part 27 at extreme other end of arm 20, will not change position in either diagram, no matter what position part 17 is adjusted in, when the crank is at its lowest throw which is the reversing point in the forward stroke, shown in the diagrams to the right. Thus the main object desired is accomplished.

It will be readily seen that any intermediate adjustments of either toggle, or both at the same time, will not alter the position of point F on part 27 when the crank is at point F on path c.

In operation, it is the short toggle adjustment that determines mainly the nature of the differential movement, and the length of the stroke adjustment is a secondary matter, but the stroke is also altered by adjustment along arc a—a to some extent. This difference in stroke is readily seen by noticing how much closer together the pitman full line 7 and dotted line 7 in Figure 18 are than the same lines in Figure 19, although solid lines FF are in identically the same position in both cases. The adjustment of the long toggle changes the nature of the stroke only slightly; its main purpose is to allow of much more change in the length of the stroke than is possible with one rocker or toggle, or two toggles of equal length, while maintaining the desired kind or nature of stroke given by the short toggle. By examining the arcs f—f and d—d, it will be seen that these arcs diverge from each other upwardly. That means that not only is the stroke lengthened by the shortening of the lever arm on member 20, but at the same time the stroke is lengthened due to angularity of adjustment as shown by the divergence of the before-mentioned arcs.

It is important to bear this in mind because if, for example, pivot 22 with rocker arm 20 were completely reversed to an upside down position from that shown, the arcs f—f and d—d would converge towards the fulcrum of the arm, and there would be but slight gain of stroke when the lever arm is shortened. But on the other hand if the short toggle is placed in such a position in relation to the pitman that the operating angle between them is obtuse in place of acute as shown in Figures 18 and 19, then the position of the rocker arm pivot 22 as shown in Figures 18 and 19 becomes improper and the rocker arm must then be placed upside down, which position is improper where the working angle between the pitman and the short rocker is acute.

It will be understood that in other reciprocating structures, not shown, it may become necessary to turn the head motion here shown upside down, or at any other angle, and that the toggles here shown in compression may also operate in tension, and that a spring shown in compression may equally well be arranged to work in tension, and that the angles limiting the motion may be the supplements of the angles here shown.

It will also be understood that a single rocker or toggle, or two toggles of nearly equal length, may be used, and many other combinations may be employed to satisfy the main object of this invention. I have, however, shown the construction I have found to give me the most all-around service for concentrating tables.

In practice the operator knows fairly well the length of stroke best for his particular problem, hence he places the short toggle in the medium position and adjusts on the long toggle until he obtains the desired stroke, then he experiments with the proper nature of stroke on the short toggle until he obtains the desired separation. It is because of the more frequent use of the short toggle adjustment that it has been designed to be very accessible, and the adjustment completed almost instantly to any position desired.

The casing 1 is filled with oil to the approximate level shown in Figure 15, and the radial arm 11 at all times covers the slot so that there is no leakage of oil whatsoever out of the casing. By providing a reserve of oil in the casing, lubrication becomes a relatively minor problem, as a great deal of splash occurs, throwing oil up on the lid and dripping it down on the ball-socket joints and into the reservoirs provided in the pitman for oil, and into the other journal members.

Since the driving mechanism of this invention may be employed to drive many types of devices of which concentrating tables, screens and reciprocating conveyors are examples, it is intended that the phrase "driven member" in the claims shall have a scope to include any device adapted to be driven by the head motion structure of this invention.

As those skilled in the art will at once appreciate, the subject matter of this invention is adapted to variation without departure from the novel scope therefor, and I do not, therefore, desire to be strictly limited to the disclosure which has been used in an illustrative sense but rather by the full scope of the claims granted.

What is claimed is:

1. In a mechanism of the type described the combination with a driven member and spring supports therefor, of a variable stroke driving mechanism for reciprocating said driven member, means for connecting said driving member to said driven member so as to place said spring supports under stress, and means for adjusting the stroke of said driving member while maintaining unchanged the initial stress in said spring supports.

2. In a mechanism of the type described the combination with a driven member supported for reciprocation, of driving means for reciprocating it comprising a support, a crank journaled on said support, a rocker arm journaled on said support, a linkage system pivotally bearing on one end of said support and at the other end on said rocker arm, a pitman connecting said crank to said linkage system, means for adjusting the position of the pivotal bearing point of the linkage system on the support to vary the stroke of said driving mechanism, and means for connecting said driven member to said rocker arm under tension whereby the whole system is maintained under a fixed initial tension for the various strokes of said driving mechanism.

3. In a mechanism of the type described the combination with a driven member supported for reciprocation, of driving means for reciprocating it comprising a support, a crank journaled on said support, a rocker arm journaled on said support, a linkage system pivotally bearing on one end of said support and at the other end on said rocker arm, a pitman connecting said crank to said linkage system, means for adjusting the position of the pivotal bearing point on the rocker arm to vary the stroke of said driving mechanism, and means for connecting said driven member to said rocker arm under tension whereby the whole system is held automatically under a fixed initial tension for the various strokes of said driving mechanism.

4. In a mechanism of the type described the combination with a resiliently supported driven member to be reciprocated, of driving means for reciprocating it comprising a support, a crank journaled on said support, a rocker arm journaled on said support, a linkage system pivotally bearing on one end of said support and at the other end on said rocker arm, a pitman connecting said crank to said linkage system, means for adjusting the position of the pivotal bearing point on the rocker arm to vary the stroke of said driving mechanism, means for adjusting the position of the pivotal bearing point of the linkage system on the support to vary the stroke of said driving mechanism, and means for connecting said driven member to said rocker arm under tension whereby the whole system is maintained without change under a fixed initial tension for the various strokes of said driving mechanism.

5. In a mechanism of the type described the combination comprising a support, a driven member, springs connecting said driven member with said support, a crank journaled on said support, a rocker arm journaled on said support, a pair of open ended levers, an adjustably positioned pivot member on said support for supporting one end of one of said levers, a pivot member mounted on said rocker arm for supporting one end of the other of said levers, a pitman mounted on said crank and carrying a bearing member engaging the other ends of said levers and a tension member for connecting the rocker arm with said driven member whereby said springs are maintained initially stressed for various strokes of said driving member.

6. In a mechanism of the type described the combination comprising a support, a driven member, springs connecting said driven member with said support, a crank journaled on said support, a rocker arm journaled on said support, a pair of open ended levers, a pivot member on said support for supporting one end of one of said levers, an adjustably positioned pivot member mounted on said rocker arm for supporting one end of the other of said levers, a pitman mounted on said crank and carrying a bearing member engaging the other ends of said levers and a tension member for connecting the rocker arm with said driven member whereby said springs are stressed.

7. In a mechanism of the type described the combination comprising a support, a driven member, springs connecting said driven member with said support, a crank journaled on said support, a rocker arm journaled on said support, a pair of open ended levers, an adjustably positioned pivot member on said support for supporting one end of one of said levers, an adjustably positioned pivot member mounted on said rocker arm for supporting one end of the other of said levers, a pitman mounted on said crank and carrying a bearing member engaging the other ends of said levers and a tension member for connecting the rocker arm with said driven member whereby said springs are stressed.

8. In a mechanism of the type described the combination comprising a support, a driven member, spring supports for connecting the driven member to said support, a power driven crank shaft, a rocker arm, a pitman mounted on said crank shaft and carrying a bearing member, a pivot member mounted on said support, an open ended lever extending between the bearing member on the pitman and said pivot member, a pivot support on said rocker arm, an open ended lever extending between the bearing member on said pitman and said pivot support, and means for connecting said rocker arm to said driven member so as to place the spring supports under tension and said open ended levers under compression.

9. In a mechanism of the type described the combination comprising a support, a driven member, spring supports for connecting the driven member to said support, a power driven crank shaft, a rocker arm, a pitman mounted on said crank shaft and carrying a bearing member, a pivot member mounted on said support, an open ended lever extending between the bearing member on the pitman and said pivot member, a pivot support on said rocker arm, an open ended lever extending between the bearing member on said pitman and said pivot support, means for connecting said rocker arm to said driven member so as to place the spring supports under tension and said open ended levers under compression, and means for adjusting the position of said pivot member about the axis of the bearing member on the pitman to vary the stroke of the driving mechanism.

10. In a mechanism of the type described the combination comprising a support, a driven member, spring supports for connecting the driven member to said support, a power driven crank shaft, a rocker arm, a pitman mounted on said crank shaft and carrying a bearing member, a pivot member mounted on said support, an open ended lever extending between the bearing member on the pitman and said pivot member, a pivot support on said rocker arm, an open ended lever extending between the bearing member on said pitman and said pivot support, means for connecting said rocker arm to said driven member so as to place the spring supports under tension and said open ended levers under compression, and means for adjusting the position of said pivot support on said rocker arm about the axis of the bearing member on the pitman to vary the stroke of said mechanism.

11. In a mechanism of the type described the combination comprising a support, a driven member supported for reciprocation, spring means interposed between the driven member and the support, a power driven crank shaft, a rocker arm, a pitman mounted on said crank shaft and carrying a bearing member, a pivot member mounted on said support, an open ended lever extending between the bearing member on the pitman and said pivot member, a pivot support on said rocker arm, an open ended lever extending between the bearing member on said pitman and said pivot support, means for connecting said rocker arm to said driven member so as to place the connecting means under spring tension and said open ended levers under compression, and means for adjusting the position of said pivot support on said rocker arm about the axis of the bearing member on the pitman, and means for adjusting the position of said pivot member about the axis of the bearing member on the pitman to vary the stroke of the driving mechanism.

12. In a mechanism of the type described the combination comprising a support, a driven member supported for reciprocation, spring means interposed between the driven member and the said support, a power driven crank shaft, a rocker arm, a pitman mounted on said crank shaft and carrying a bearing member, a pivot member mounted on said support, an open ended lever extending between the bearing member on the pitman and said pivot member, a pivot support on said rocker arm, an open ended lever extending between the bearing member on said pitman and said pivot support, means for connecting said rocker arm to said driven member so as to place the connecting means under spring tension and said open ended levers under compression, and means for adjusting said connecting means to vary the tension in said springs and the compression in said levers.

13. In a mechanism of the type described the combination with a driven member supported for reciprocation, of a support, a variable stroke driving mechanism carried by the support for reciprocating said driven member, means for connecting said driving member to said driven member, a spring interposed between the support and the driven member, means to adjust said spring to give an initial stress, and means for adjusting the stroke of said driving mechanism so that substantially the same initial spring tension is maintained in the mechanism without altering the adjustment of the said spring.

14. In a mechanism of the type described, the combination with a driven member supported for reciprocation, of a support, a variable stroke driving mechanism carried by the support for reciprocating said driven member, means for connecting said driving member to said driven member, a spring to take up lost motion in the driving mechanism, interposed between the support and the driven member, means to adjust said spring to give an initial stress, and means for adjusting the stroke of said mechanism while automatically maintaining substantially the same initial stress in the spring at one end of the stroke, while the spring resistance at the other end of the stroke becomes greater as the stroke is made longer.

GUSTAVE A. OVERSTROM.